United States Patent
Mohammed et al.

(10) Patent No.: US 11,618,364 B1
(45) Date of Patent: Apr. 4, 2023

(54) SYSTEMS AND METHODS FOR EMPTY CONTAINER REMOVAL

(71) Applicant: Amazon Technologies, Inc., Seattle, WA (US)

(72) Inventors: Raashid Mohammed, Lynnwood, WA (US); Majid Abdul, Bellevue, WA (US); Srinivas Nallapati, Maple Valley, WA (US); Daniel Ruffatto, Des Moines, WA (US); Hunter D. HeLal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 656 days.

(21) Appl. No.: 16/708,324

(22) Filed: Dec. 9, 2019

(51) Int. Cl.
*B60P 1/56* (2006.01)
*B62B 5/06* (2006.01)
*B62B 3/00* (2006.01)

(52) U.S. Cl.
CPC .............. *B60P 1/56* (2013.01); *B62B 3/002* (2013.01); *B62B 5/06* (2013.01); *B62B 2202/12* (2013.01); *B62B 2203/70* (2013.01); *B62B 2207/00* (2013.01); *B62B 2301/044* (2013.01)

(58) Field of Classification Search
CPC ... B60P 1/56; B62B 3/002; B62B 5/06; B62B 2202/12; B62B 2203/70; B62B 2207/00; B62B 2301/044; B62B 2203/07; B62B 2203/071; B62B 2202/073; B07C 5/36; B07C 3/02; B07C 2501/0018; B07C 5/366; B07C 5/365; B65G 11/00; B65G 1/1373; B66B 13/00; B65F 9/00; B65B 1/04

See application file for complete search history.

(56) References Cited

U.S. PATENT DOCUMENTS

| | | | | |
|---|---|---|---|---|
| 968,511 | A * | 8/1910 | Collins | B60P 1/56 298/35 R |
| 2,029,093 | A * | 1/1936 | Choate | B60P 1/56 298/35 R |
| 4,802,810 | A * | 2/1989 | Gunn | B65G 59/08 D34/28 |
| 6,095,314 | A * | 8/2000 | Fortenbery | B65G 47/766 198/360 |

(Continued)

FOREIGN PATENT DOCUMENTS

CN 107021121 A * 8/2017
WO WO-2018191512 A1 * 10/2018 ............... B07C 5/00

OTHER PUBLICATIONS

Translated CN-107021121-A (Year: 2022).*

*Primary Examiner* — James A Shriver, II
*Assistant Examiner* — Ian Bryce Shelton
(74) *Attorney, Agent, or Firm* — Eversheds Sutherland (US) LLP

(57) ABSTRACT

Systems, methods, and apparatuses are disclosed for empty container removal. In one embodiment, an example method for removing empty containers may include opening a first gate, pushing a cart past the first gate, the cart comprising a handle and a trapdoor, where the cart comprises the empty containers, sliding the handle of the cart in a lateral direction from a default position to an extended position, opening a second gate, pushing the cart past the second gate using the handle, and actuating the trapdoor from a closed position to an open position, where actuating the trapdoor causes the empty containers to fall down a chute.

16 Claims, 12 Drawing Sheets

(56) References Cited

U.S. PATENT DOCUMENTS

| | | | | |
|---|---|---|---|---|
| 6,796,615 | B1* | 9/2004 | Clark | B60P 1/56 |
| | | | | 414/469 |
| 7,346,956 | B2* | 3/2008 | Andre | B08B 1/02 |
| | | | | 15/381 |
| 7,537,426 | B1* | 5/2009 | Dunn | E04D 15/003 |
| | | | | 414/495 |
| 9,821,829 | B1* | 11/2017 | Paulsen | B62B 3/04 |
| 10,181,108 | B1* | 1/2019 | Graybill | G06Q 10/0639 |
| 10,829,322 | B1* | 11/2020 | Smith | B61D 7/02 |
| 11,286,122 | B2* | 3/2022 | Zhang | B65G 11/023 |
| 2006/0011220 | A1* | 1/2006 | Mueller | B08B 3/022 |
| | | | | 134/123 |
| 2007/0012340 | A1* | 1/2007 | Jones | A61L 2/10 |
| | | | | 134/131 |
| 2009/0266833 | A1* | 10/2009 | Savage | B62B 5/06 |
| | | | | 280/47.11 |
| 2011/0147164 | A1* | 6/2011 | Webster | B66B 31/006 |
| | | | | 198/463.6 |
| 2017/0183158 | A1* | 6/2017 | Zhu | B65G 1/065 |
| 2017/0297837 | A1* | 10/2017 | Burns | B65G 67/46 |
| 2019/0389672 | A1* | 12/2019 | Zhang | B07C 3/00 |

\* cited by examiner

SYSTEMS AND METHODS FOR EMPTY CONTAINER REMOVAL

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. In addition, robust handling equipment for objects, such as items, packages, containers, and so forth, may be helpful in improving fulfillment center operations, reducing risk of injury, and other benefits. Moreover, delivery of inventory to fulfillment centers or distribution centers may arrive in containers, such as corrugate containers. Removing empty containers may be problematic due to the size of some of the containers, the amount of containers, and/or the number of floors in a fulfillment center.

Figure 1:
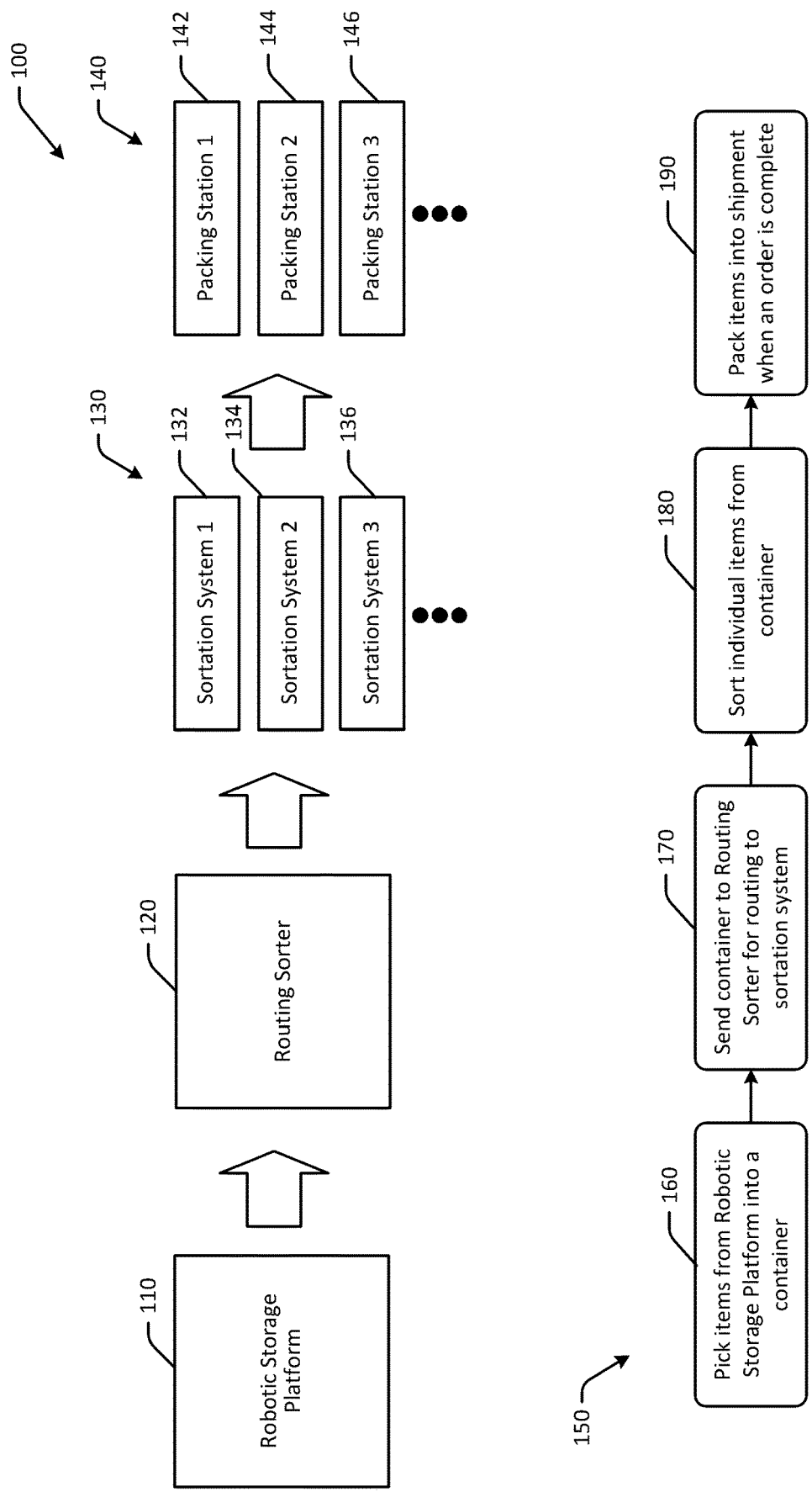
FIG. 1 is a hybrid schematic illustration of an example use case for systems and methods for empty container removal and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted.

Inventory for fulfillment centers or other distribution centers may arrive in containers, such as boxes, cartons, shipping containers, and so forth. In many instances, inventory may be delivered to fulfillment centers in corrugated cardboard containers. Once emptied, containers may be disposed of (e.g., crushed or otherwise processed and sent to recycling centers, etc.). For example, a container may be emptied into inventory in the fulfillment center, and the empty container may need to be removed from the fulfillment center. In some instances, fulfillment centers may have more than one floor, which may complicate the empty container removal process by requiring elevators or other systems. In addition, pallet jacks and/or other equipment may be needed to move empty containers from one location to another.

Embodiments of the disclosure include methods and systems and methods for empty container removal that may be used to simplify and improve the process of removing empty containers from a fulfillment center, while at the same time increasing safety and eliminating the need for pallet jacks, elevators, and other components. Some embodiments include carts, gating systems, and chutes that can be used to safely and quickly remove empty containers from locations. Some embodiments include carts that facilitate loading and transport of empty containers from an inventory portion of a fulfillment center to a gating system that can be used to automatically actuate a trapdoor on a bottom of the cart, thereby causing the empty containers to fall from the cart into one or more chutes. A conveyor belt, auger, or other component may be disposed at the end of the chute, and the empty containers may be processed and removed from the fulfillment center.

Referring to FIG. 1, an example use case 100 for systems and methods for empty container removal and an example process flow in accordance with one or more embodiments of the disclosure. Although discussed in the context of online orders, other embodiments may be directed to any suitable use case where items, such as products, packages, or other items, are picked and/or sorted, such as instances where users may pick up orders rather than receiving a shipment.

In FIG. 1, a fulfillment center may include a robotic storage platform 110, a routing sorter 120, one or more sortation systems 130, and one or more packing stations 140. The robotic storage platform 110 may be a portion of the fulfillment center at which products picked from product inventory are placed. Inventory may be delivered to the fulfillment center in containers, and the items may be removed from the containers and placed into inventory at the robotic storage platform 110. The empty containers may then be removed from the fulfillment center. Robots may be used to pick products from inventory and to deliver to the robotic storage platform in some instances, while in other instances, manual operators or a combination thereof may be used to pick products. The picking process at the robotic storage platform may include locating a product in an order, obtaining the product, and sending the product to the robotic storage platform 110, such as via a conveyor belt (e.g., smooth belt, cleated belt, etc.). In the illustrated embodiment, products at the robotic storage platform 110 may be placed in a container, such as a tote.

At the routing sorter 120, totes including products that have been picked may be routed to an appropriate or designated sortation system. For example, the routing sorter 120 may determine an identifier associated with the tote, and may determine the sortation system associated with the tote using the identifier. The routing sorter 120 may route or direct the tote to the appropriate sortation system.

The sortation systems 130 may include one or more sortation system machines. In FIG. 1, a first sortation system 132, a second sortation system 134, a third sortation system 136, and so forth may be included. Any number of sortation systems may be included. Some or all of the sortation systems may be associated with certain totes, certain functions, certain geographic regions, and so forth. The sortation systems may be used to consolidate or otherwise aggregate products for single or multi-item orders. For example, a first tote may include a first item of a multi-item order, and a second tote may include a second item of the multi-item order. The sortation system may therefore identify the orders associated with the respective products in a tote, and may transport the products to a container, such as a bin, associated with the order. When the order is complete with all of the products in the associated bin, the order may be packed. Accordingly, a specific sortation system may be designated for fulfillment of a particular order. At the sortation systems 130, totes that are received via the routing sorter 120 may be emptied, and the products in the respective totes may be transported to the appropriate bins for the orders for which the products were picked.

After a single or multi-item order is complete (e.g., the sortation system has delivered all of the products in the order to the appropriate bin, etc.), the order may be packed at the packing station 140. In some embodiments, one or more packing stations may be included. In some instances, a packing station may service more than one sortation system, while in other instances, more than one packing station may service one sortation system. In the illustration of FIG. 1, a first packing station 142 may be used to pack orders from the first sortation system 132, a second packing station 144 may be used to pack orders from the second sortation system 134, a third packing station 146 may be used to pack orders from the third sortation system 136, and so forth. At the packing stations 140, the orders may be placed into boxes and sealed for subsequent shipment. The packages may then be processed for shipment to the user. In other instances, the sortation systems 130 may be used to sort packages designated for different geographic regions, and may therefore output packages to different loading docks, etc. The sortation systems 130 may be used for additional sortation purposes.

At the fulfillment center, an example process flow 150 illustrated in FIG. 1 may be implemented to improve the efficiency and/or throughput of the fulfillment center. At a first block 160, items may be picked from the robotic storage platform 110 into a container, such as a tote. At a second block 170, the tote may be sent to the routing sorter 120 for routing to a sortation system. At a third block 180, the items from the tote may be sorted from the container by the sortation system. At a fourth block 190, the items may be packed into a shipment when all of the items in the order are sorted or when an order is complete.

Figure 2:
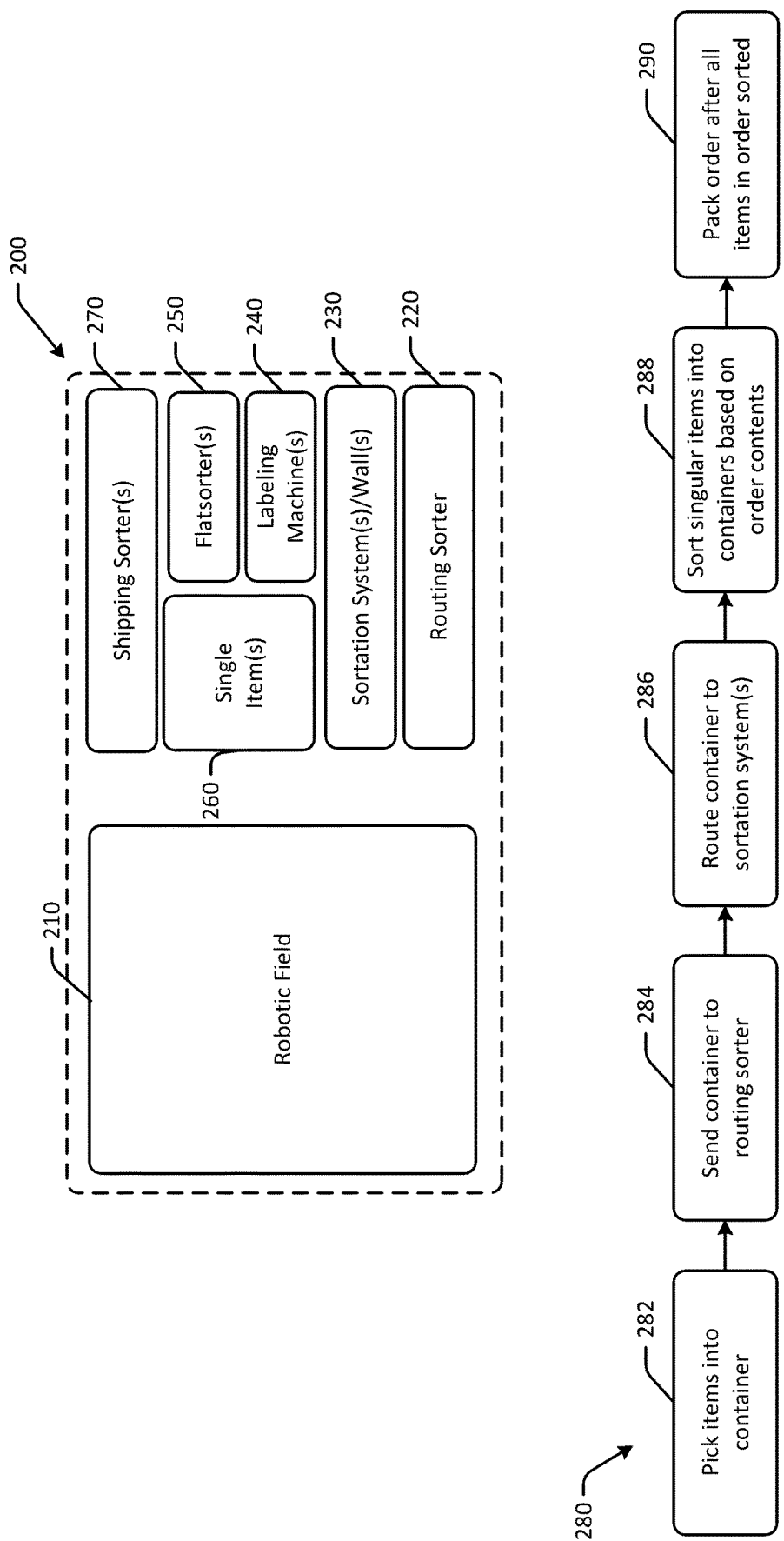
FIG. 2 is a hybrid schematic illustration of an example use case for systems and methods for empty container removal and an example process flow in accordance with one or more embodiments of the disclosure.

FIG. 2 is a hybrid schematic illustration of an example use case for systems and methods for empty container removal and an example process flow in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to route containers or other items to certain sortation systems, one or more sortation systems or walls 230 that may be used to sort single or multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

The fulfillment center 200 may implement a process flow 280 for processing single or multi-item orders. At a first block 282, items for different orders may be picked into a tote or container that may be sent to a sorting machine, such as one of the sortation systems 230. The tote may include items from any order that is being consolidated by the specific sortation system machine. The sortation system may sort singular items into single or multi-item orders. At a second block 284, the tote may be sent to a routing sorter. At a third block 286, the routing sorter may route or divert the tote to any sortation or an assigned sortation system (e.g., the sortation system that is consolidating items for a particular order for multi-order instances, etc.). At a fourth block 288, the sortation system may sort singular items from the tote or container into a different tote or container based on the order contents. For example, the containers at the sortation system may be assigned to a particular order that may be single or multi-item. At a fifth block 290, the order may be packed after all items in the order are sorted.

The sortation system machines 220 may include bins or containers of different sizes (e.g., small, medium, large, etc.) and may be configured, in one example, to handle items that weigh up to twenty or more pounds. The totes (or other containers) may be stored at angles, such as inclined angles, that may help avoid buildup of items on a particular side of the tote. In some embodiments, the sortation system machines 220 may include multiple chutes, and may be configured to sort items at a rate of about 3,600 units per hour. In some instances, the sortation system machines 220 may have two inductors (e.g., one on each side, etc.) for inducting items from containers, and may be modular.

In some embodiments, the sortation system machines 220 may replace other processes, such as manual processes. For example, manual induction of products from a tote to a sorter machine may be a bottleneck that is avoided by the systems and methods described herein. The sortation system 230 may include cross-belt shuttles that sort singulated products into containers or totes. Sortation systems 230 may be capable of sorting at a rate of 3,500 units per hour. Certain sortation system machines 230 may be configured to handle items of up to twenty pounds, or more in some instances (e.g., 100 pounds or more), with dimensions of about 18"×14"×8" or 28"×14"×9", which may cover almost all products at the fulfillment center 200. The sortation system 230 may operate as a high-speed, high-destination sort solution that intakes items or packages and sorts them into containers using a shuttle that travels vertically and horizontally inside the machine (or outside in some instances).

Individual sortation systems may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of bins (e.g. induct individual items from a bin that has multiple items, and place the inducted items into the appropriate bin, where bins are associated with single or multi-item orders. The tote from which items are inducted may be associated with the individual sortation system machine (e.g., the modular sorting machines that form the individual sortation system machine, etc.).

Accordingly, in some embodiments, sortation systems may be arranged in rows and may receive assigned totes from a routing sorter, thereby streamlining fulfillment center operation and reducing labor and space costs. The sortation systems may process totes for multi-order sortation and consolidation. As a result, there may no longer be a need to singulate and send items to a wall for manual extraction, because each tote may be assigned to a particular sortation system machine. Induct stations can be replaced with sortation system machines.

In another embodiment, pickers may pick items directly to a segmented belt conveyor at a station that is near a sortation system machine. Other nearby pick stations may also pick items directly to conveyance for the same sortation system machine. Picked items being transported to a single sortation system machine may merge together to be inducted into their unique sortation system machine, where multi-item orders may be consolidated and sent to packing.

Embodiments of the disclosure include systems and methods for empty container removal. Certain embodiments may improve processing speed and/or throughput of fulfillment centers. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 3:
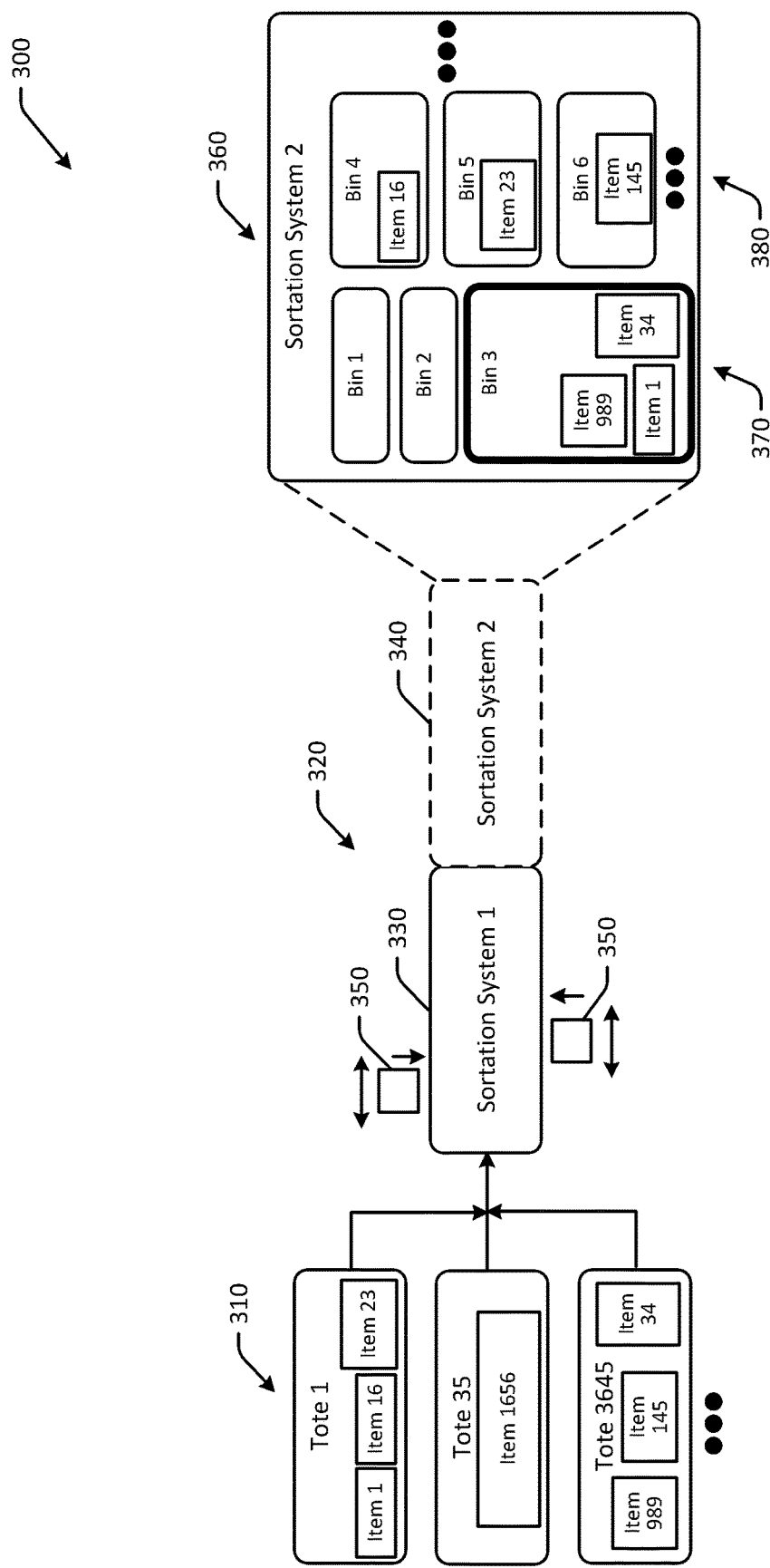
FIG. 3 is a schematic illustration of an item sorting system that may be used at a fulfillment center in accordance with one or more embodiments of the disclosure.

FIG. 3 is a schematic illustration of an item sorting system that may be used at a fulfillment center in accordance with one or more embodiments of the disclosure. Other embodiments may include additional or fewer components. The illustration of FIG. 3 is not to scale, and may not be illustrated to scale with respect to other figures. The sortation system illustrated in FIG. 3 may be the same sortation system discussed with respect to FIGS. 1-2.

In FIG. 3, an example use case 300 including a set of totes 310 and item sorting system(s), or sortation system(s) 320, is depicted. The set of totes 310 may include one or more totes that may be assigned to, or otherwise associated with, the sortation system 320. For example, Tote 1, Tote 35, Tote 3645, and so forth may be associated with the sortation system 320. The totes may have identifiers, such as alphanumeric or other identifiers. The totes may be used to place items that have been picked into the totes. The items that are placed in the totes may be associated with orders that are to be consolidated by the sortation system 320. For example, Tote 1 may include item 1, item 16, and item 23, Tote 35 may include item 1656, Tote 3645 may include item 989, item 145, and item 34, and so forth. The item sorting system, or the sortation system 320, may be configured to receive items from a tote that includes one or more, such as multiple items, and the tote may be routed to the item sorting system or the sortation system 320.

The totes 310 may be directed to the sortation system 320 for sorting and consolidation. For example, items in the totes 310 may be inducted into the sortation system 320 via a conveyor belt.

The sortation system 320 may include one or more modules, and may be adjusted in size by adding or removing modules or standalone sortation systems as needed. For example, the sortation system 320 may include a first sortation system 330 and a second sortation system 340. The second sortation system 340 may be coupled to the first sortation system 330, or may be a standalone sortation system.

The respective sortation systems 330, 340 may include one or more bins, or containers that hold items of a single or multi-item order. For example, as illustrated in side view 360, the second modular item sorting machine 340 may include a first chute 370, or vertical stacking, of bins, and a second chute 380 of bins. The bins in the respective chutes may be of different sizes or dimensions, or may be placed in different vertical locations along the chute. The containers may be stored at angled positions. The sortation system 320 may include a plurality of bins disposed in an array along one or more sides of the first modular item sorting machine 330 and the second modular item sorting machine 340. The respective bins may be configured to be repositioned within different chutes and/or at different vertical locations. In FIG. 3, Bin 1 and Bin 2 may have the same height, while Bin 3 in the same column or chute may have a different height. Any suitable number of bins may be included in a chute and/or array.

Items or products inducted from the totes 310 may be sorted and directed to a bin associated with the order for which the item was picked. The items may be transported by one or more shuttles or mobile carrier units 350, which may move in one or more directions within the sortation system 320. In some embodiments, the shuttles or mobile carrier units 350 may be positioned outside of the sortation system 320. In some embodiments, the sortation system(s) 320 may include one or more mobile carrier units 350 or other shuttles that can be used to move items, such as products, packages, containers, and so forth. Mobile carrier units 350 may include one or more RFIDs that can be used to retain traceability of an item to a carrier, such that the entire system may not have to be purged in case of a complete power loss. The lineage or traceability can be established by associating a barcode or other identifier of the item with the carrier RFID tag at the point of induction or elsewhere.

For example, Item 1 may be inducted from Tote 1 and placed in Bin 3, along with Item 989 and Item 34 from Tote 3645. Bin 3 may be associated with an order that included those three items, and may therefore be ready for packing. Similarly, Item 16 may be routed to Bin 4, Item 23 may be routed to Bin 5, Item 145 may be routed to Bin 6, and so forth. Any number of bins, totes, and/or modules may be included.

Figure 4:
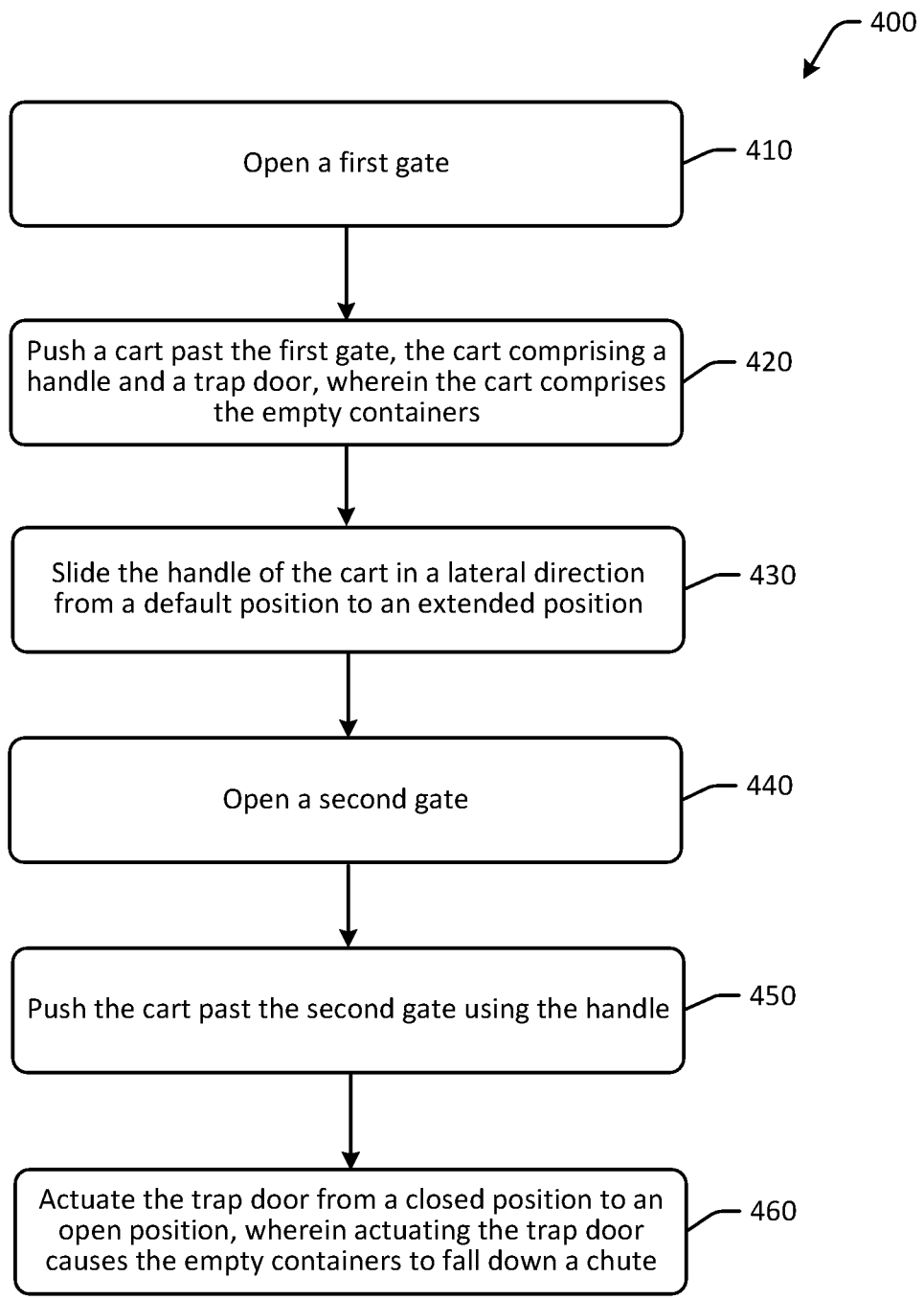
FIG. 4 is a schematic illustration of an example process flow for empty container removal in accordance with one or more embodiments of the disclosure.

FIG. 4 is a schematic illustration of an example process flow 400 for empty container removal in accordance with one or more embodiments of the disclosure. The process flow 400 may be a process for using a facility in which a system for empty container removal as described herein is implemented. One or more of the blocks illustrated in FIG. 4 may be performed in a different order. In some embodiments, such as those with automated components, the operations of process flow 400 may be performed by a controller or computer system in communication with one or more empty container removal systems.

Block 410 of the process flow 400 includes opening a first gate. For example, an operator or user of a facility may open a first gate. The first gate may be a swinging gate, a sliding gate, or another type of gate. The first gate may provide access to a fenced in area or environment in which operators may not be allowed. For example, a cart full of empty containers may be pushed into the fenced in area, or otherwise pushed past the first gate. The user may therefore open the first gate in order to push a cart past the first gate. In some embodiments, the first gate may be automatically opened using one or more sensors configured to detect the presence of a cart near the first gate.

Block 420 of the process flow 400 include pushing a cart past the first gate, the cart comprising a handle and a trapdoor, wherein the cart comprises the empty containers. For example, the operator or user of the facility may push the cart past the first gate and into the fenced in area. To push the cart past the first gate, the operator may use a handle disposed along a side of the cart. The user may close the first gate after pushing the cart past the first gate. The cart may include a trapdoor along a bottom or lower portion of the cart, which may be actuated or otherwise released to allow the empty containers in the cart to fall out of the cart. In some embodiments, the cart may be an autonomous cart and may automatically drive past the first gate.

Block 430 of the process flow 400 includes sliding the handle of the cart in a lateral direction from a default position to an extended position. For example, the operator or user of the facility may slide the handle of the cart sideways along the frame of the cart from a default position to an extended position. The handle may be a telescoping handle, a sliding handle, or other handle that allows the handle to extend in a sideways direction. The user may access the handle through a hole or a gap in the fenced in area that corresponds to the height of the handle. To slide the handle, the user may manually pull or otherwise manipulate the handle, while in other instances, the handle may automatically extend. In some embodiments, the handle may be optional (e.g., in embodiments with autonomous carts, etc.).

Block 440 of the process flow 400 includes opening a second gate. For example, an operator or user of a facility may open a second gate. The second gate may be a swinging gate, a sliding gate, or another type of gate. In some embodiments, the second gate may not open or close in the same manner as the first gate (e.g., the first gate may swing and the second gate may slide, etc.). The second gate may provide access to a chute area. In some embodiments, the second gate may be automatically opened using one or more sensors configured to detect the presence of a cart near the second gate. In some instances, the first gate may have to be closed prior to opening of the second gate (e.g., thereby implementing an interlock system, etc.). In addition, in some instances, the user may initiate or unlock the second gate prior to opening by pressing an unlock button or switch, which may trigger a check of whether the first gate is closed prior to unlocking the second gate.

Block 450 of the process flow 400 includes pushing the cart past the second gate using the handle. For example, the operator or user of the facility may push the cart past the second gate using the handle in the extended position. Because the handle may be in the extended position, the user may be able to push the cart using the handle without entering the fenced in area. As the cart is pushed past the second gate, the cart may roll along rails or edge platforms disposed along opposite sides of the chute, such that the cart is on top of the chute and the trapdoor of the cart is aligned with, or substantially aligned with, the chute. In some embodiments, the cart may be an autonomous cart and may automatically drive past the second gate.

Block 460 of the process flow 400 includes actuating the trapdoor from a closed position to an open position, wherein actuating the trapdoor causes the empty containers to fall down a chute. For example, an operator or user of the facility may push the cart over the chute, which may cause a trapdoor actuation mechanism, such as that illustrated in FIG. 7, to mechanically actuate a trapdoor release mechanism on the cart. As a result, the trapdoor may be released, and gravity may cause the empty containers or other payload of the cart to fall from the cart and down the chute. In some embodiments, the trapdoor may include springs or biased hinges to slow the opening of the trapdoor. In some embodiments, to facilitate pushing of the cart over the chute and pulling the empty cart back, a set of rails may be included along external surfaces of the sidewalls of the cart. The rails may be engaged with corresponding wheels coupled to the fencing along the sides of the chute, so as to lift the cart itself as it is pushed over the chute. This may avoid the need to have the wheels of the cart aligned when pushing and/or pulling the cart over the chute. The rails may be tube steel and may cause the cart to be slightly elevated with respect to ground level when pushed over the chute.

After the empty containers are emptied from the cart, the user may pull the cart back past the second gate using the handle. As the cart is pulled back, a lifting or raised wedge or other component (e.g., roller wheels, etc.) positioned between the first gate and the second gate, and disposed at or near the floor, may be used to mechanically push the trapdoor from the open position back to the closed position. Once the cart is pulled past the second gate, the user may slide the handle from the extended position back to the default position. The user may close the second gate, and may open the first gate, and then may pull the cart past the first gate, or out from the fenced in area. The first gate may not be opened until the second gate is closed in some embodiments. The cart may then be returned to the floor to collect other empty containers.

Figure 5:
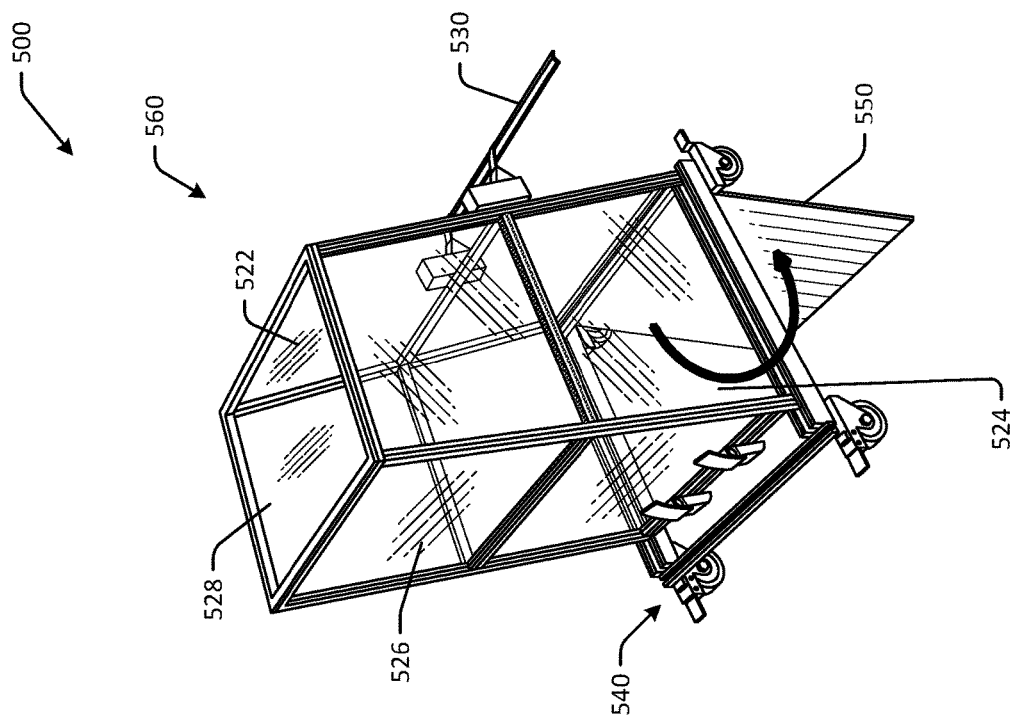
FIGS. 5-6 are schematic illustrations of a cart that may be used with systems and methods for empty container removal in accordance with one or more embodiments of the disclosure.
Figure 5:
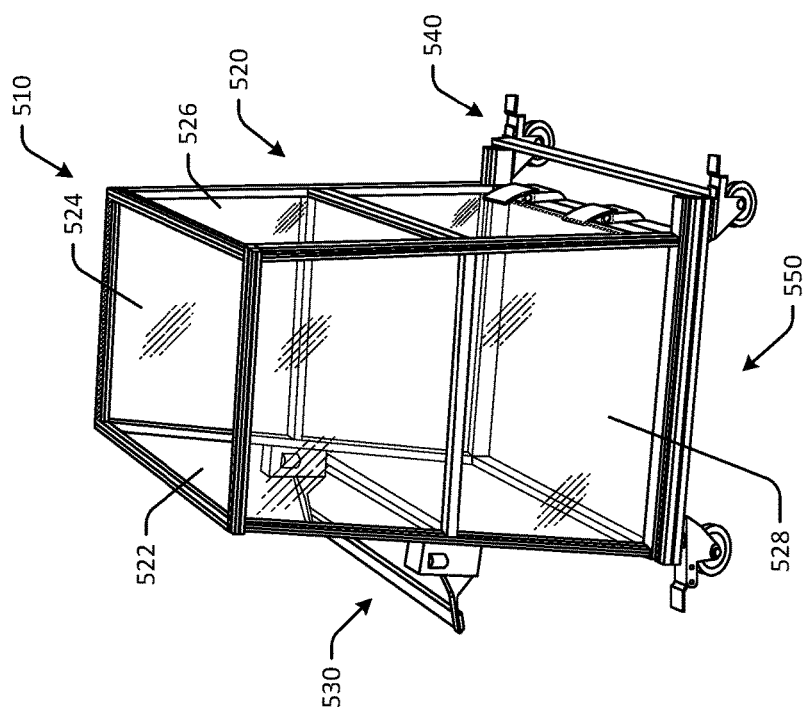
Figure 6:
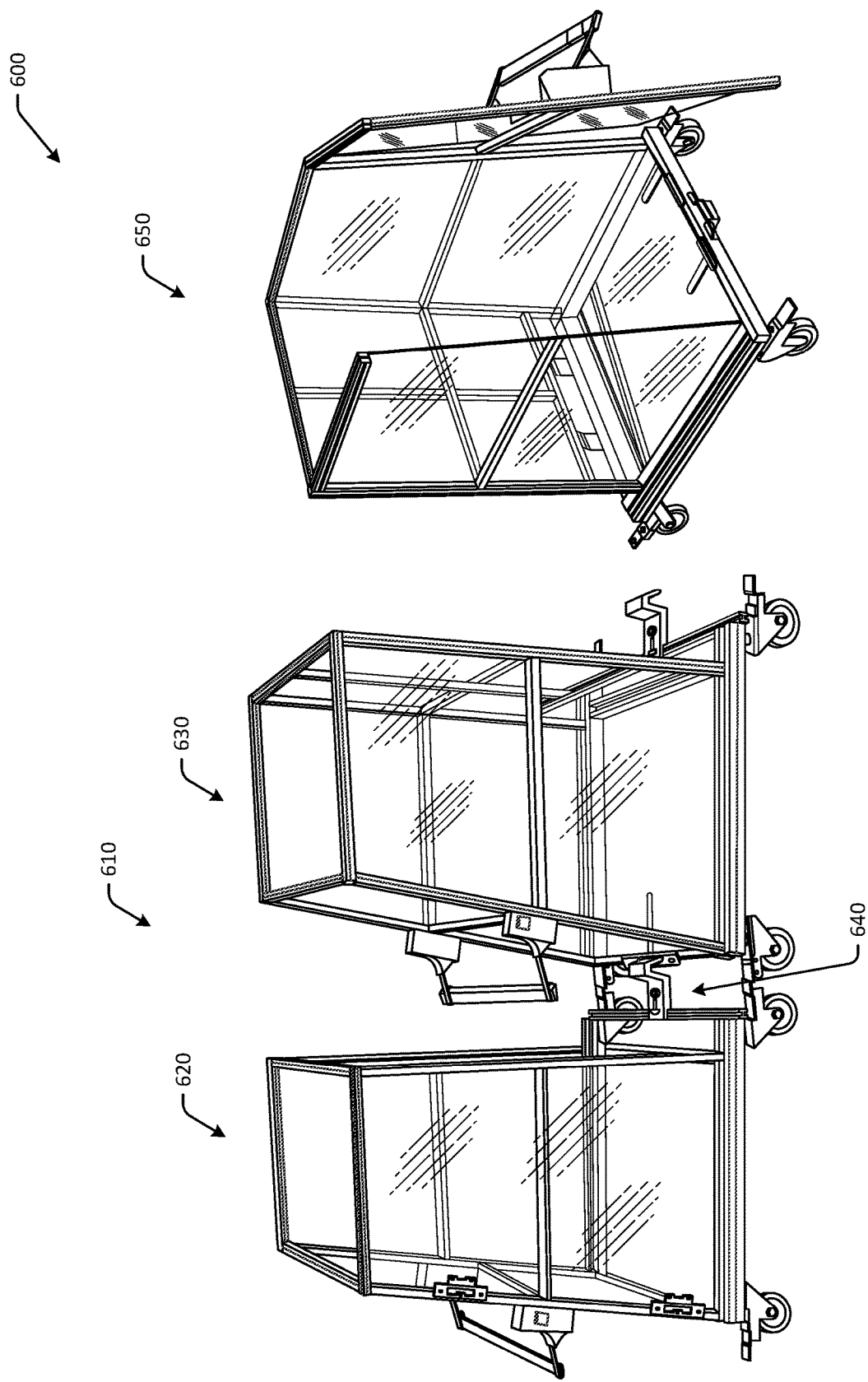

FIGS. 5-6 are schematic illustrations of a cart that may be used with systems and methods for empty container removal in accordance with one or more embodiments of the disclosure. Other embodiments may include additional or fewer components. The illustration of FIG. 5 may not be to scale, and may not be illustrated to scale with respect to other figures. The cart illustrated in FIG. 5 may be the same cart discussed with respect to FIGS. 1-4.

In FIG. 5, a cart 500 is depicted in a first perspective view 510 and a second perspective view 560. The cart 500 may be a rollable cart and may therefore include one or more wheels. In some embodiments, the cart 500 may be a slideable cart that may not include wheels. The cart 500 may have a tapered form factor, in that an inlet of the cart 500 at a top of the cart 500 may have smaller dimensions (e.g., length and/or width, etc.) than an outlet of the cart 500 at the bottom of the cart 500. Users may place empty containers, such as broken or unbroken corrugate containers, boxes, plastic containers, etc. into the cart 500 at the top of the cart 500. To remove the empty containers from the cart 500, the user may cause a trapdoor at the bottom of the cart 500 to open. The tapered form factor may assist with prevention of jams inside the cart 500. For example, empty containers placed into the top of the cart 500 may fall freely into the cart 500 due to the tapered sidewalls. To create the tapered form factor, the cart 500 may include tapered sidewalls 520, such that one or more of the sidewalls of the cart 500 are angled relative to a vertical alignment. For example, the cart 500 may include a first angled sidewall 522 that forms a front of the cart 500, a second angled sidewall 524, a third sidewall 526 that may be vertically aligned or positioned and may form a rear of the cart 500, and a fourth angled sidewall 528. In some embodiments, all of the sidewalls may be angled, while in other embodiments, some, but not all, of the sidewalls may be angled.

Some or all of the sidewalls may be at least partially transparent, such that a user can visualize the contents of the cart 500. For example, the first angled sidewall 522 may be formed of a transparent material, or may include a transparent portion, to allow users to visualize contents of the cart 500.

The cart 500 may include a handle 530. The handle 530 may be a slideable handle. For example, the handle 530 may be configured to slide along a frame of the cart 500 in a lateral or sideways direction, such as that illustrated in the second perspective view 560. In some embodiments, in order to achieve the sliding motion, the handle 530 may be a telescoping handle that includes a portion that telescopes linearly outwards. In other embodiments, the entire handle 530 may be pulled or pushed in a linear and/or lateral direction (e.g., the handle 530 may be coupled to the cart 500 using a sliding rail or other mechanism to facilitate linear motion of the handle 530, etc.).

The cart 500 may be rollable and may therefore include one or more wheels. In the illustrated embodiment, the cart 500 includes four wheels, including front wheels that are disposed at a front end of the cart 500, and rear wheels 540 that are disposed at a rear end of the cart 500. The wheels may be caster wheels. Any number of wheels may be included. The rear wheels 540 may be offset from a rear edge or face of the cart 500. For example, the rear wheels 540 may be separated from a rear portion of the frame of the cart 500, so as to facilitate opening and closing of a trapdoor 550 of the cart.

The cart 500 may include the trapdoor 550 at a bottom of the cart 500. The trapdoor 550 may be opened to provide an outlet for empty containers in the cart 500 to flow out of the cart 500. The trapdoor 500 may be a swinging trapdoor 550 and may be coupled to the cart 500 using hinges located at a front end of the cart 500. As a result, when opened or released, the trapdoor 550 may swing downwards towards a front of the cart 500. The hinges may be biased hinges and/or springs or dampers may be used to reduce the speed with which the trapdoor 550 opens. The trapdoor 550 may be secured in a closed position using one or more latches that may be mechanically released by downward pressure. As a result, when downward pressure is applied to the latch(es), the trapdoor 550 may be released from the closed position illustrated in the first perspective view 510, and may move to the open position illustrated in the second perspective view 560. In some embodiments, downward pressure may be applied to the latch(es) using one or more components at a fencing or gating system, such as that illustrated in FIG. 7. To return the trapdoor 550 to a closed position, the trapdoor 550 may be pushed upwards until the latch(es) are engaged. The cart 500 may then be refilled with empty containers. In other embodiments, other securing mechanisms may be used instead of latches, such as magnets, switches, buttons, and the like. In some embodiments, the cart 500 may be semi-autonomous or fully autonomous, and may have a fully automated trapdoor 550. Similarly, some embodiments may include an electric assist via a motor coupled to the trapdoor 550 to facilitate return of the trapdoor 550 from an open position to a closed position, and/or from a closed position to an open position.

In FIG. 6, a set of carts 600 is illustrated in a towing arrangement 610 and an open door configuration 650. The set of carts 600 may be one or more of the carts 500 discussed with respect to FIG. 5. In the towing arrangement 610, a first cart 620 may include a hinge 640 that allows a second cart 630 to be coupled to the first cart 620. As a result, both carts may be moved together by a single user or multiple users. In the open door configuration 650, one or more sidewalls of the cart may be openable to access the interior of the cart. For example, the sidewall to which the handle is coupled (which may or may not be the front facing sidewall) may be a swinging door that can be used to access any jams or to add and/or remove contents from the cart.

Figure 7:
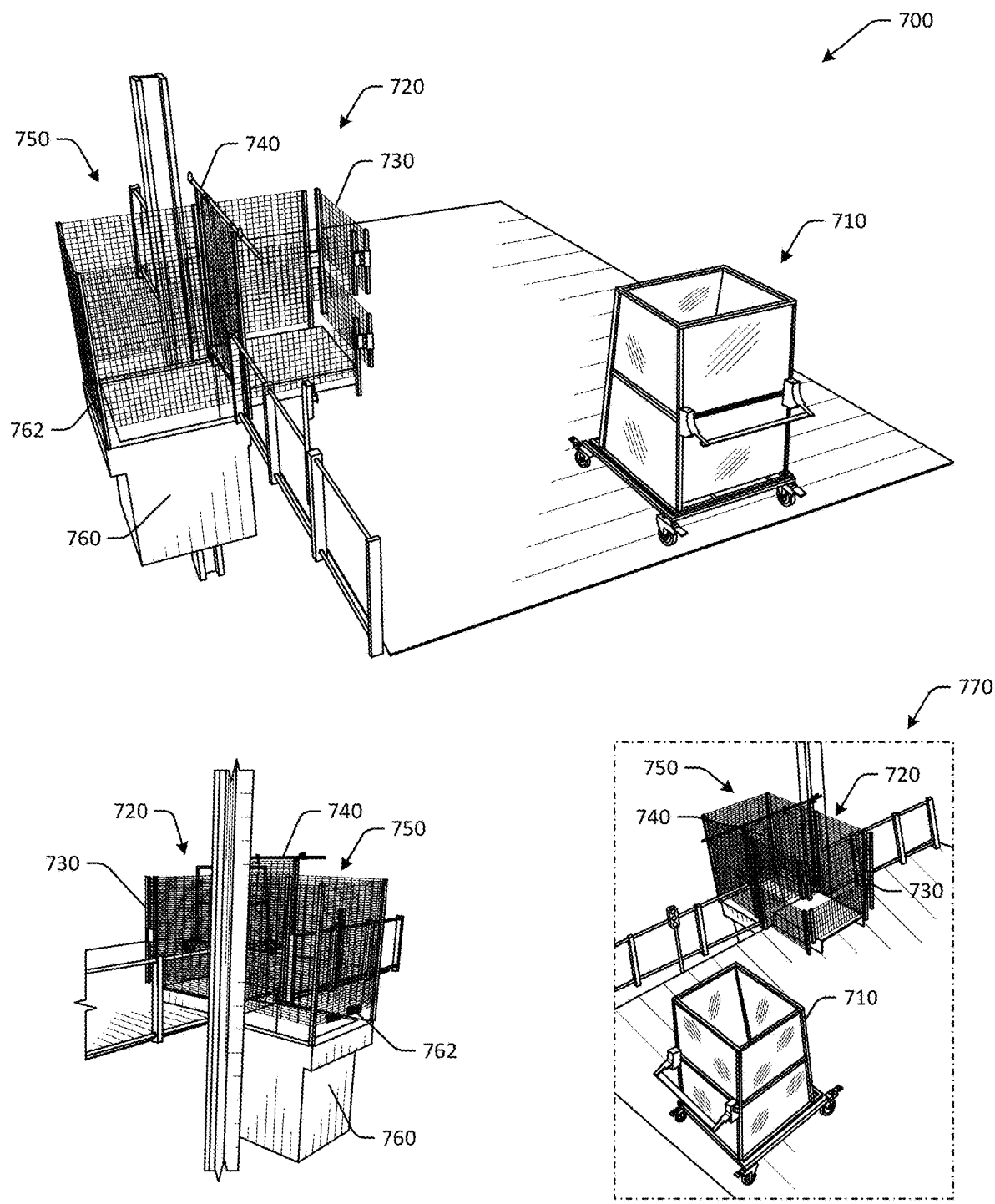
FIGS. 7-8 are schematic illustrations of an example system for empty container removal in different views in accordance with one or more embodiments of the disclosure.
Figure 8:
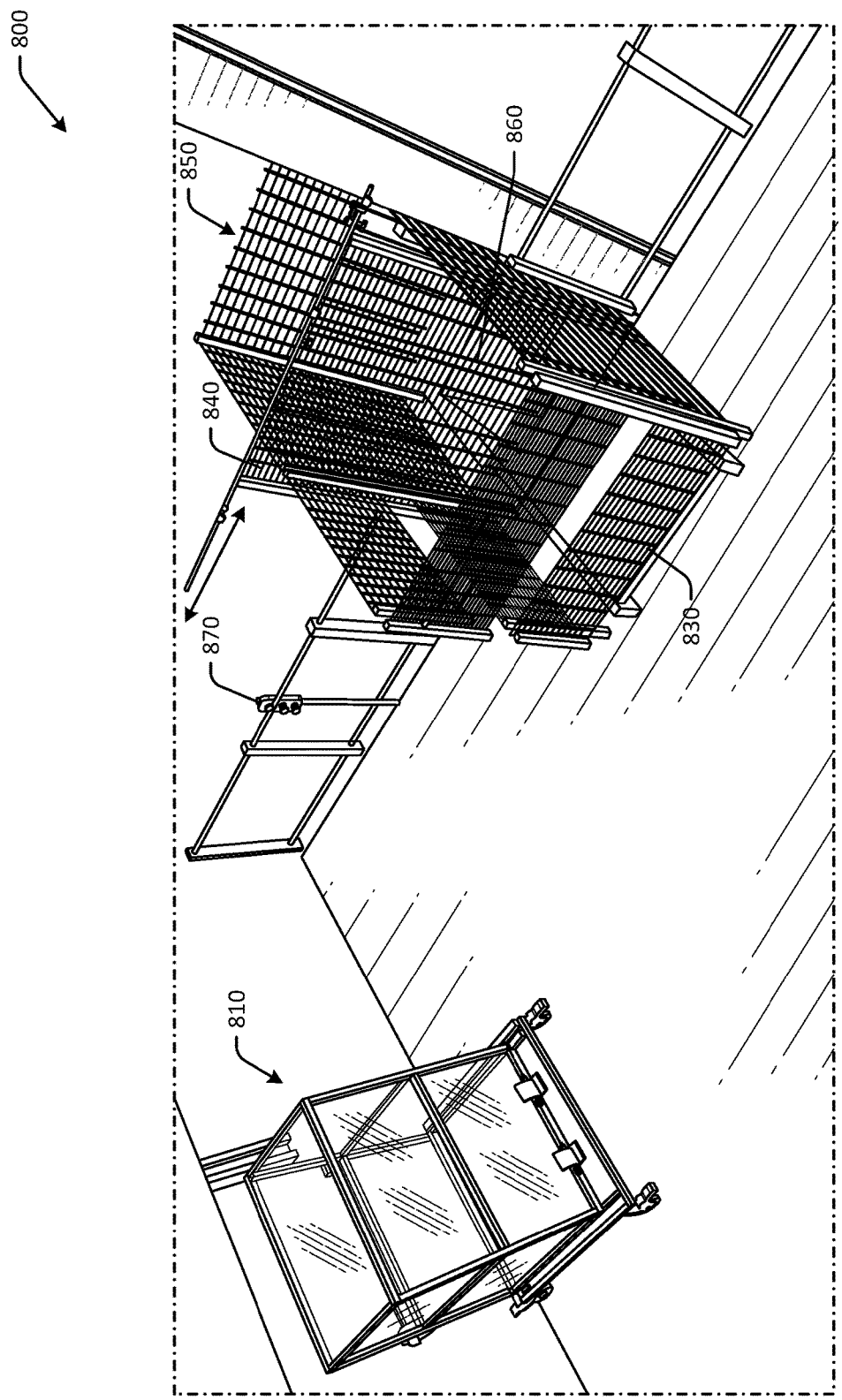

FIGS. 7-8 are schematic illustrations of an example system 700 for empty container removal in different views in accordance with one or more embodiments of the disclosure. The example system 700 may include some of the same components discussed with respect to FIGS. 1-6. Other embodiments may include additional, fewer, or different components.

In FIG. 7, the system 700 may be an empty container removal system and may include a cart 710, a gate system 720, and a chute 760. The cart 710 may be the cart discussed with respect to FIGS. 5-6. The cart 710 may be a rollable cart that includes one or more tapered sidewalls, a trapdoor, and a handle configured to slide along a frame of the rollable cart in a lateral direction. The cart 710 may be configured to transport empty containers to the chute 760.

The gate system 720 may include a first gate 730, a second gate 740, a trapdoor actuation mechanism 762, and fencing that forms a closed area between the first gate 730 and the second gate 740. The fencing may form a protected area between the first gate 730 and the second gate 740 to prevent human access. The fencing may surround the chute 760 that may be adjacent to the second fence 740. The fencing may include a gap through which a handle of the cart is accessible, as illustrated in FIG. 8.

Figure 11:
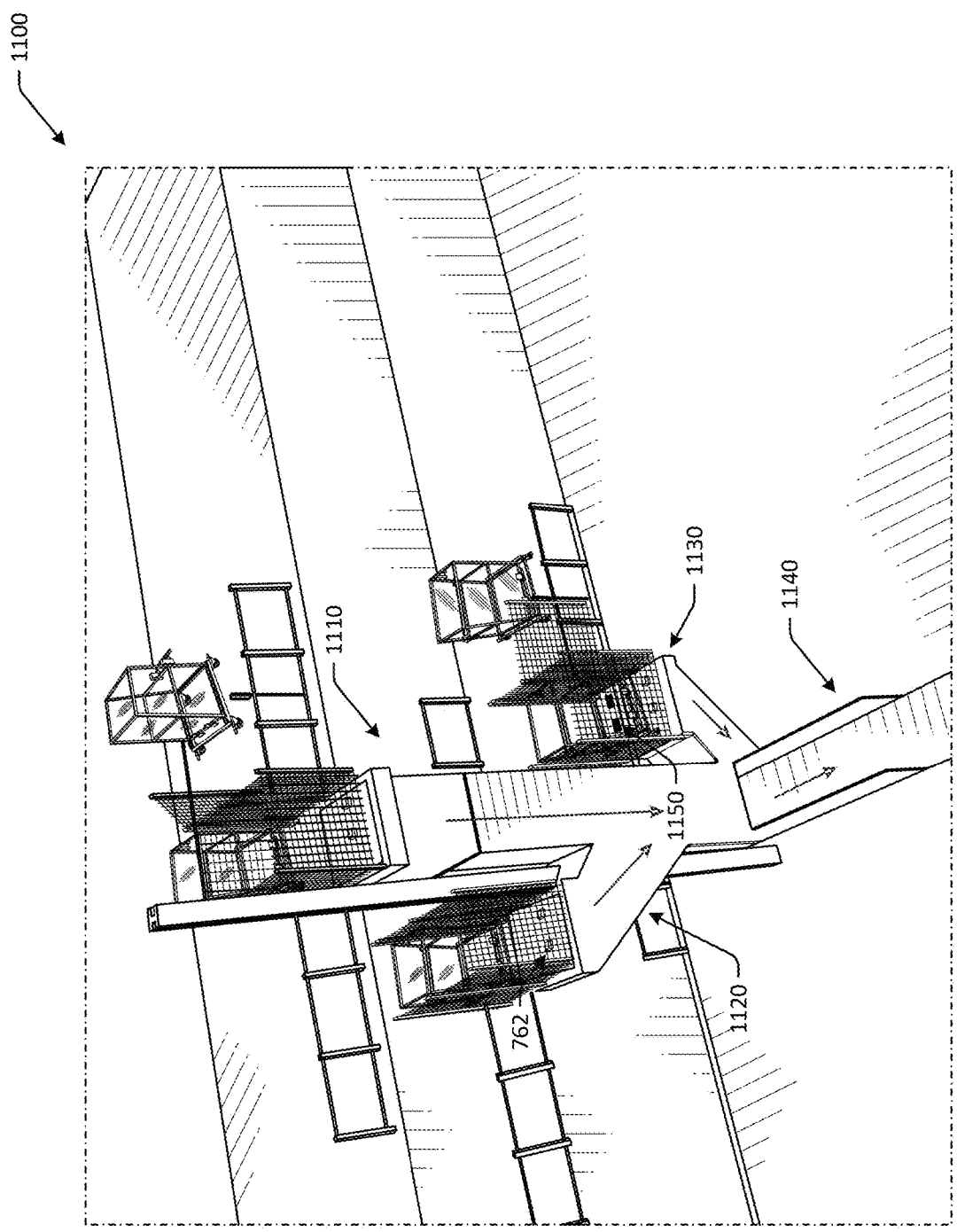
FIG. 11 is a schematic illustration of a chute system in accordance with one or more embodiments of the disclosure.

The cart 710 may be pushed into a fenced environment 750 between the first gate 730 and the second gate 740, after which the first gate 730 may be closed and the second gate 740 may be opened. The cart 710 may then be pushed over the chute 760 using the handle in the extended position, which may be accessed through the gap in the fencing, such that a human does not have to enter the fenced environment. As the cart 710 is pushed past the second gate 740, the trapdoor actuation mechanism 762, as also depicted in FIG. 11, may actuate the latch(es) that secure the trapdoor of the cart 710, and the trapdoor may open so as to release the empty containers. After the cart 710 is empty, the cart 710 may be pulled back towards the first gate 730, and in the process may be pulled over a raised wedge at or near the floor that is configured to return the trapdoor to a closed position.

The empty containers may fall into the chute 760. The chute 760 may be disposed adjacent to the second gate 740, and may lead to a conveyor belt, an auger, a loading dock, or elsewhere.

In some embodiments, an unlock button 780 that unlocks the first gate 730 and/or the second gate 740 may be included to provide additional safety in an interlock system formed by the first gate 730 and the second gate 740. In some embodiments, the first gate 730 may be a swinging gate, and the second gate 740 may be a sliding gate. In other embodiments, both gates may be swinging or sliding gates, or another arrangement. In some embodiments, an access hatch may be included for manual clearance of any jams.

In FIG. 8, a system 800 is depicted in a perspective view. The system 800 may be the system 700 of FIG. 7. As illustrated in FIG. 8, a cart 810 may be pushed to a gate system 820, which includes a swinging gate 830 and a sliding gate 840. A chute 860 may be disposed adjacent to the sliding gate 840 and may be in a fenced environment 850. A user may use an unlock button 870 or other switch to confirm the swinging gate 830 is closed and/or to unlock the sliding gate 840. The sliding gate 840 and/or swinging gate 830 may be automated or manually operable.

Figure 9:
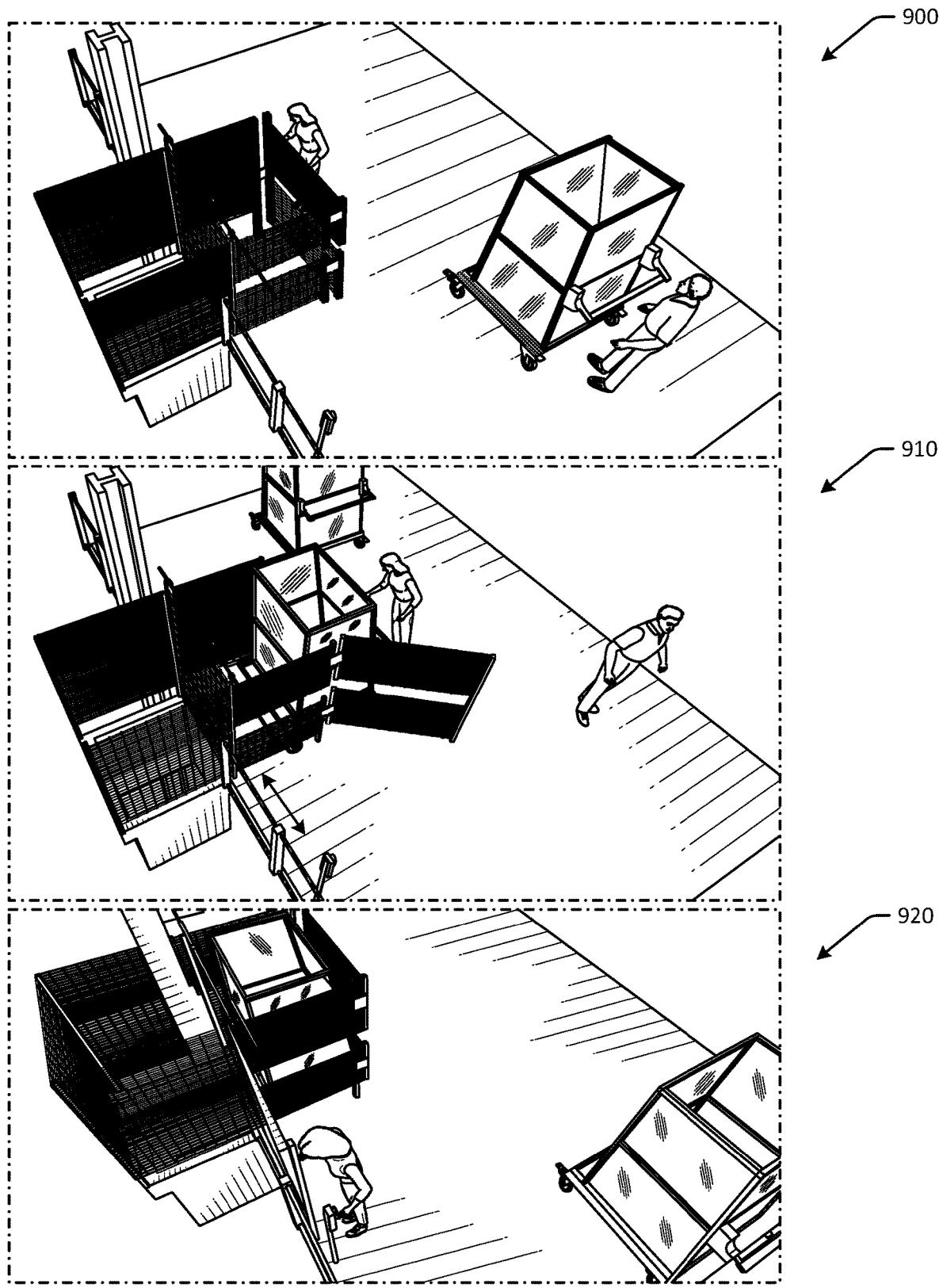
FIGS. 9-10 are schematic illustrations of an example system for empty container removal in different stages in accordance with one or more embodiments of the disclosure.
Figure 10:
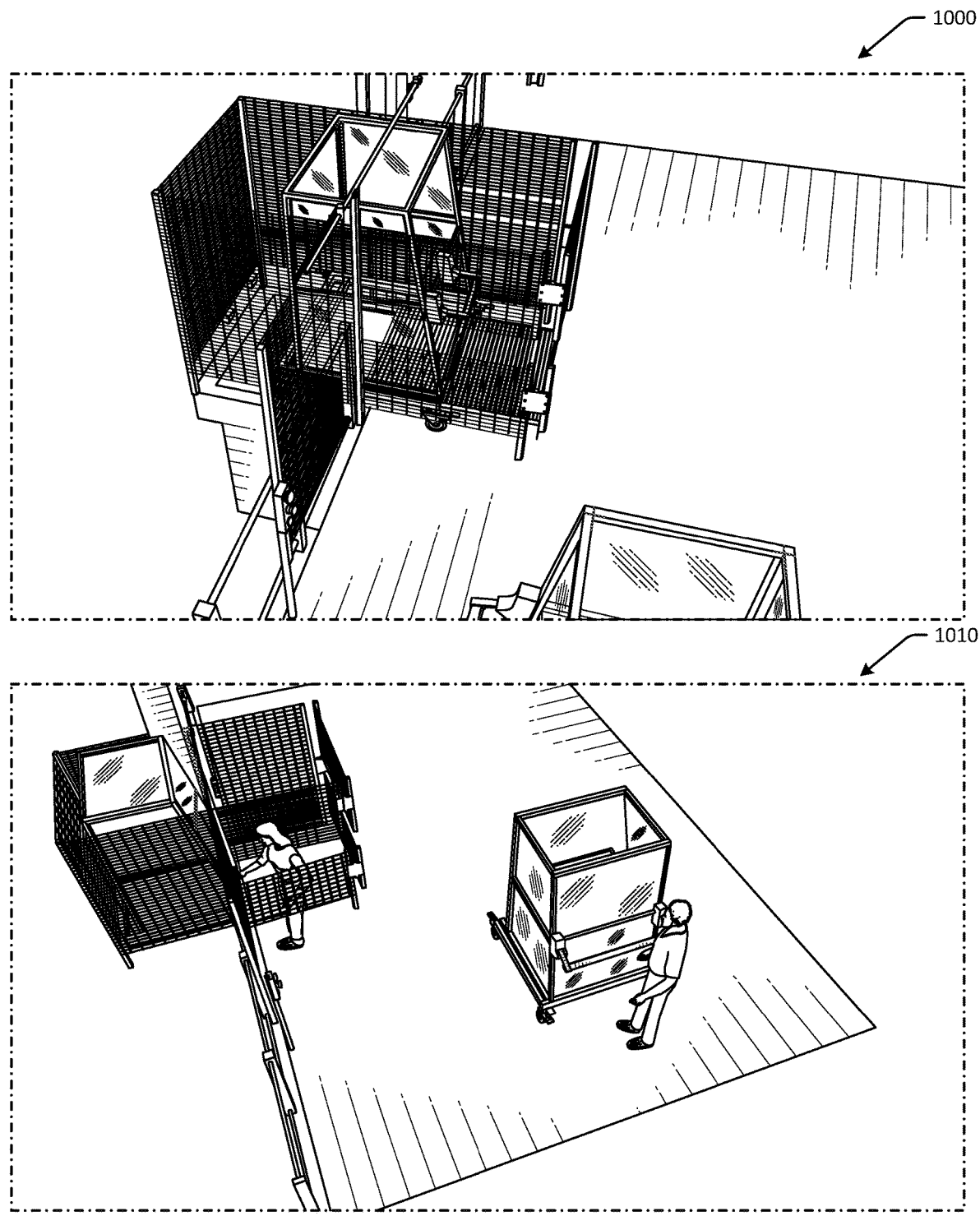

FIGS. 9-10 are schematic illustrations of an example system for empty container removal in different stages in accordance with one or more embodiments of the disclosure. Other embodiments may include additional or fewer components. The illustration of FIGS. 9-10 may not be to scale, and may not be illustrated to scale with respect to other figures. The system illustrated in FIGS. 9-10 may be the same system discussed with respect to FIGS. 1-8.

At a first instance 900 in FIG. 9, a cart may be loaded with empty containers and pushed to a gate system. In particular, the cart may be pushed to the first gate of the gate system. At a second instance 910 in FIG. 9, a user may open the first gate and may push the cart past the first gate. At a third instance 920 in FIG. 9, the user may close the first gate and may extend the handle of the cart through the gap in the fencing of the fenced environment. The user may press the unlock button to unlock the second gate after closing the first gate, and may open the second gate, such as by sliding the second gate.

At a fourth instance 1000 in FIG. 10, the cart may be pushed past the second gate and over the chute. At a fifth instance 1010 in FIG. 10, the cart may be pushed against a trapdoor actuation mechanism coupled to the fence, which may actuate or otherwise release the trapdoor of the cart, causing the empty containers in the cart to fall down the chute. The user may then pull the cart back towards the first gate. In some instances, as the cart is pulled towards the first gate, the cart may be pulled over a raised wedge (e.g., raised wedges 1150 in FIG. 11, etc.) positioned between the first gate and the second gate, where the raised wedge causes the trapdoor to return to the closed position. The user may close the second gate, press the unlock button, and may open the first gate and remove the cart. The cart may then be returned to service.

FIG. 11 is a schematic illustration of a chute system 1100 in accordance with one or more embodiments of the disclosure. Other embodiments may include additional or fewer components. The illustration of FIG. 11 may not be to scale, and may not be illustrated to scale with respect to other figures. The chute system illustrated in FIG. 11 may be the same system discussed with respect to FIGS. 1-10.

In FIG. 11, the chute system 1100 may include a first chute 1110 that may be on a floor that is above ground level. The chute system 1100 may include more than one chute. For example, a second chute 1120 may be used to service a different floor and may feed into a main chute. A third chute 1130 may service yet another floor and may feed into the main chute. The chute system 1100 may feed a conveyor belt 1140 that may take empty containers to an auger, a loading dock, or elsewhere for processing. In some embodiments, lighting indicators may be included to indicate to other floors when a chute is in use, thereby reducing likelihood of jams in the chute. The conveyor belt 1140 may be activated when weight is detected on the conveyor belt 1140. In some embodiments, one or more photo eyes or other sensors may be used to determine whether a particular chute is in use, and if so, access to other chutes may be blocked by preventing unlocking of one or more gates. Photo eyes or sensors may be used to locate jams within chutes as well. Some embodiments may include an angled ramp adjacent to the conveyor belt 1140 to reduce impact velocity of empty containers on the conveyor belt 1140.

One or more operations of the methods, process flows, or use cases of FIGS. 1-11 may have been described above as being performed by a user device, or more specifically, by one or more program module(s), applications, or the like executing on a device. It should be appreciated, however, that any of the operations of the methods, process flows, or use cases of FIGS. 1-11 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-11 may be described in the context of the illustrative devices, it should be appreciated that such operations may be implemented in connection with numerous other device configurations.

The operations described and depicted in the illustrative methods, process flows, and use cases of FIGS. 1-11 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-11 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 12:
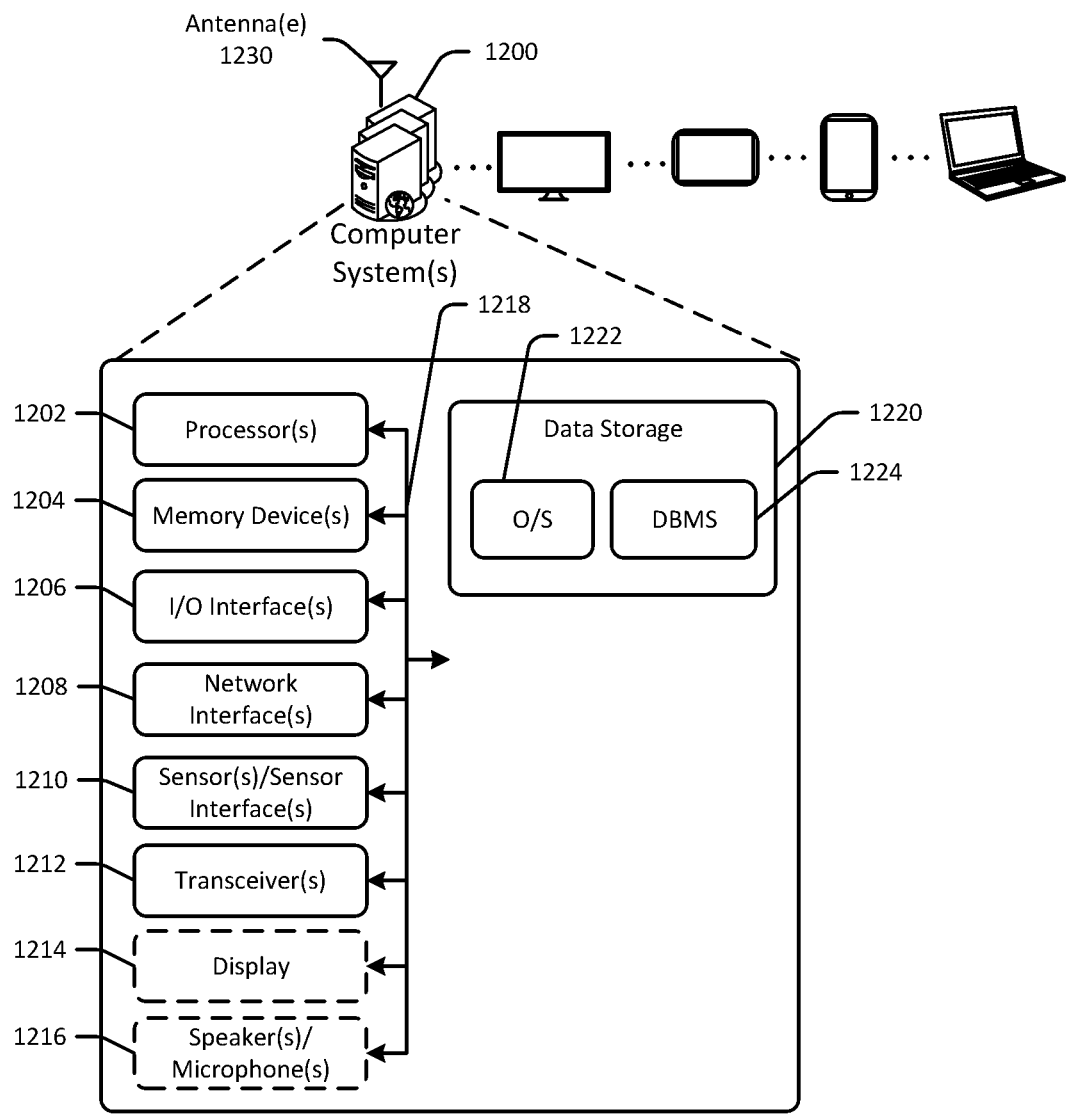
FIG. 12 schematically illustrates an example architecture of a computer system that may be associated with a system for empty container removal in accordance with one or more embodiments of the disclosure.

FIG. 12 is a schematic block diagram of one or more illustrative computer system(s) 1200 in accordance with one or more example embodiments of the disclosure. The computer system(s) 1200 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 1200 may correspond to an illustrative device configuration for a controller(s) or computer system(s) that may be used to automate one or more components or processes of the empty container removal system described in FIGS. 1-11.

The computer system(s) 1200 may be configured to communicate with one or more servers, user devices, or the like. The computer system(s) 1200 may be configured to control operation of one or more components of the empty container removal system.

The computer system(s) 1200 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 1200 may include one or more processors (processor(s)) 1202, one or more memory devices 1204 (also referred to herein as memory 1204), one or more input/output (I/O) interface(s) 1206, one or more network interface(s) 1208, one or more sensor(s) or sensor interface(s) 1210, one or more transceiver(s) 1212, one or more optional display(s) 1214, one or more optional microphone(s) 1216, and data storage 1220. The computer system(s) 1200 may further include one or more bus(es) 1218 that functionally couple various components of the computer system(s) 1200. The computer system(s) 1200 may further include one or more antenna(e) 1230 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1218 may include at least one of a system bus, a memory bus, an address bus, or a message bus, and may permit the exchange of information (e.g., data (including computer-executable code), signaling, etc.) between various components of the computer system(s) 1200. The bus(es) 1218 may include, without limitation, a memory bus or a memory controller, a peripheral bus, an accelerated graphics port, and so forth. The bus(es) 1218 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1204 of the computer system(s) 1200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1204 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1204 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1220 may include removable storage and/or non-removable storage including, but not limited to, magnetic storage, optical disk storage, and/or tape storage. The data storage 1220 may provide non-volatile storage of computer-executable instructions and other data. The memory 1204 and the data storage 1220, removable and/or non-removable, are examples of computer-readable storage media (CRSM) as that term is used herein.

The data storage 1220 may store computer-executable code, instructions, or the like that may be loadable into the memory 1204 and executable by the processor(s) 1202 to cause the processor(s) 1202 to perform or initiate various operations. The data storage 1220 may additionally store data that may be copied to the memory 1204 for use by the processor(s) 1202 during the execution of the computer-executable instructions. Moreover, output data generated as a result of execution of the computer-executable instructions by the processor(s) 1202 may be stored initially in the memory 1204, and may ultimately be copied to the data storage 1220 for non-volatile storage.

More specifically, the data storage 1220 may store one or more operating systems (O/S) 1222; one or more database management systems (DBMS) 1224; and one or more program module(s), applications, engines, computer-executable code, scripts, or the like. Some or all of these module(s) may be sub-module(s). Any of the components depicted as being stored in the data storage 1220 may include any combination of software, firmware, and/or hardware. The software and/or firmware may include computer-executable code, instructions, or the like that may be loaded into the memory 1204 for execution by one or more of the processor(s) 1202. Any of the components depicted as being stored in the data storage 1220 may support functionality described in reference to corresponding components named earlier in this disclosure.

The data storage 1220 may further store various types of data utilized by the components of the computer system(s) 1200. Any data stored in the data storage 1220 may be loaded into the memory 1204 for use by the processor(s) 1202 in executing computer-executable code. In addition, any data depicted as being stored in the data storage 1220 may potentially be stored in one or more datastore(s) and may be accessed via the DBMS 1224 and loaded in the memory 1204 for use by the processor(s) 1202 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1202 may be configured to access the memory 1204 and execute the computer-executable instructions loaded therein. For example, the processor(s) 1202 may be configured to execute the computer-executable instructions of the various program module(s), applications, engines, or the like of the computer system(s) 1200 to cause or facilitate various operations to be performed in accordance with one or more embodiments of the disclosure. The processor(s) 1202 may include any suitable processing unit capable of accepting data as input, processing the input data in accordance with stored computer-executable instructions, and generating output data. The processor(s) 1202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1202 may be capable of supporting any of a variety of instruction sets.

Referring now to other illustrative components depicted as being stored in the data storage 1220, the O/S 1222 may be loaded from the data storage 1220 into the memory 1204 and may provide an interface between other application software executing on the computer system(s) 1200 and the hardware resources of the computer system(s) 1200. More specifically, the O/S 1222 may include a set of computer-executable instructions for managing the hardware resources of the computer system(s) 1200 and for providing common services to other application programs (e.g., managing memory allocation among various application programs). In certain example embodiments, the O/S 1222 may control execution of the other program module(s). The O/S 1222 may include any operating system now known or which may be developed in the future including, but not limited to, any server operating system, any mainframe operating system, or any other proprietary or non-proprietary operating system.

The DBMS 1224 may be loaded into the memory 1204 and may support functionality for accessing, retrieving, storing, and/or manipulating data stored in the memory 1204 and/or data stored in the data storage 1220. The DBMS 1224 may use any of a variety of database models (e.g., relational model, object model, etc.) and may support any of a variety of query languages. The DBMS 1224 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 1200 is a mobile device, the DBMS 1224 may be any suitable lightweight DBMS optimized for performance on a mobile device.

Referring now to other illustrative components of the computer system(s) 1200, the input/output (I/O) interface(s) 1206 may facilitate the receipt of input information by the computer system(s) 1200 from one or more I/O devices as well as the output of information from the computer system(s) 1200 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 1200 or may be separate. The I/O devices may further include, for example, any number of peripheral devices such as data storage devices, printing devices, and so forth.

The I/O interface(s) 1206 may also include an interface for an external peripheral device connection such as universal serial bus (USB), FireWire, Thunderbolt, Ethernet port or other connection protocol that may connect to one or more networks. The I/O interface(s) 1206 may also include a connection to one or more of the antenna(e) 1230 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 1200 may further include one or more network interface(s) 1208 via which the computer system(s) 1200 may communicate with any of a variety of other systems, platforms, networks, devices, and so forth. The network interface(s) 1208 may enable communication, for example, with one or more wireless routers, one or more host servers, one or more web servers, and the like via one or more networks.

The antenna(e) 1230 may include any suitable type of antenna depending, for example, on the communications protocols used to transmit or receive signals via the antenna (e) 1230. Non-limiting examples of suitable antennae may include directional antennae, non-directional antennae, dipole antennae, folded dipole antennae, patch antennae, multiple-input multiple-output (MIMO) antennae, or the like. The antenna(e) 1230 may be communicatively coupled to one or more transceivers 1212 or radio components to which or from which signals may be transmitted or received.

As previously described, the antenna(e) 1230 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1230 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1230 may be configured to transmit or receive radio frequency signals within any suitable frequency range forming part of the unlicensed portion of the radio spectrum.

The antenna(e) 1230 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1212 may include any suitable radio component(s) for—in cooperation with the antenna(e) 1230—transmitting or receiving radio frequency (RF) signals in the bandwidth and/or channels corresponding to the communications protocols utilized by the computer system(s) 1200 to communicate with other devices. The transceiver(s) 1212 may include hardware, software, and/or firmware for modulating, transmitting, or receiving—potentially in cooperation with any of antenna(e) 1230—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1212 may further include hardware, firmware, or software for receiving GNSS signals. The transceiver(s) 1212 may include any known receiver and baseband suitable for communicating via the communications protocols utilized by the computer system(s) 1200. The transceiver(s) 1212 may further include a low noise amplifier (LNA), additional signal amplifiers, an analog-to-digital (A/D) converter, one or more buffers, a digital baseband, or the like.

The sensor(s)/sensor interface(s) 1210 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 1214 may be configured to output light and/or render content. The optional speaker(s)/microphone(s) 1216 may be any device configured to receive analog sound input or voice data.

It should be appreciated that the program module(s), applications, computer-executable instructions, code, or the like depicted in FIG. 12 as being stored in the data storage 1220 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 1200, and/or hosted on other computing device(s) accessible via one or more networks, may be provided to support functionality provided by the program module(s), applications, or computer-executable code depicted in FIG. 12 and/or additional or alternate functionality. Further, functionality may be modularized differently such that processing described as being supported collectively by the collection of program module(s) depicted in FIG. 12 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 12 may be implemented, at least partially, in hardware and/or firmware across any number of devices.

It should further be appreciated that the computer system(s) 1200 may include alternate and/or additional hardware, software, or firmware components beyond those described or depicted without departing from the scope of the disclosure. More particularly, it should be appreciated that software, firmware, or hardware components depicted as forming part of the computer system(s) 1200 are merely illustrative and that some components may not be present or additional components may be provided in various embodiments. While various illustrative program module(s) have been depicted and described as software module(s) stored in the data storage 1220, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-11 may be performed by a device having the illustrative configuration depicted in FIG. 12, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-11 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-11 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An empty container removal system comprising:
    a rollable cart comprising tapered sidewalls, a trapdoor, and a handle configured to slide along a frame of the rollable cart in a lateral direction, wherein the rollable cart is configured to transport empty containers;
    a gate system comprising a first gate, a second gate, a trapdoor actuation mechanism, and fencing that forms a closed area between the first gate and the second gate, wherein the first gate is a swinging gate, and the second gate is a sliding gate;
    an unlock button that unlocks the first gate and the second gate; and
    a chute disposed adjacent to the second gate, the chute leading to a conveyor belt;
    wherein the trapdoor actuation mechanism is configured to release the trapdoor and cause the empty containers to fall down the chute.

2. The empty container removal system of claim 1, wherein the cart further comprises at least one transparent sidewall, and rear caster wheels that are offset from a rear edge of the frame of the rollable cart.

3. The empty container removal system of claim 1, wherein the fencing comprises a gap through which the handle of the cart is accessible, and wherein the gate system further comprises a raised wedge configured to return the trapdoor to a closed position.

4. A method for removing empty containers comprising:
    opening a first gate;
    pushing a cart past the first gate, the cart comprising a handle and a trapdoor, wherein the cart comprises the empty containers;
    sliding the handle of the cart in a lateral direction from a default position to an extended position;
    closing the first gate;
    pushing an unlock button after closing the first gate and before opening a second gate;
    opening the second gate;
    pushing the cart past the second gate using the handle; and
    actuating the trapdoor from a closed position to an open position, wherein actuating the trapdoor causes the empty containers to fall down a chute.

5. The method of claim 4, further comprising:
    loading the empty containers into the cart; and
    pushing the cart to the first gate.

6. The method of claim 4, further comprising:
    pulling the cart past the second gate using the handle;
    sliding the handle from the extended position to the default position;
    closing the second gate;
    opening the first gate; and
    pulling the cart past the first gate.

7. The method of claim 6, further comprising:
pulling the cart over a raised wedge positioned between the first gate and the second gate, wherein the raised wedge causes the trapdoor to return to the closed position.

8. The method of claim 6, further comprising:
pushing an unlock button after closing the second gate and before opening the first gate.

9. The method of claim 4, wherein opening the first gate comprises swinging open the first gate, and wherein opening the second gate comprises sliding open the second gate.

10. The method of claim 4, wherein an area between the first gate and the second gate in a fenced environment.

11. The method of claim 4, wherein the cart comprises caster wheels offset from a rear edge of a frame of the cart to facilitate opening of the trapdoor.

12. The method of claim 4, wherein the handle of the cart is a telescoping handle.

13. A method for removing empty containers from a cart comprising:
loading the cart with the empty containers, the cart comprising a handle and a trapdoor;
moving the cart to a first gate;
opening the first gate;
pushing the cart past the first gate;
closing the first gate;
opening a second gate;
pushing the cart past the second gate;
actuating the trapdoor from a closed position to an open position, wherein actuating the trapdoor causes the empty containers to fall down a chute;
pulling the cart past the second gate;
closing the second gate;
opening the first gate; and
pulling the cart past the first gate.

14. The method of claim 13, further comprising:
sliding the handle of the cart in a lateral direction from a default position to an extended position.

15. The method of claim 13, further comprising:
pushing an unlock button after closing the first gate and before opening the second gate.

16. The method of claim 13, further comprising:
pulling the cart over a raised wedge positioned between the first gate and the second gate, wherein the raised wedge causes the trapdoor to return to the closed position.

* * * * *